March 28, 1933.  G. R. BOTT  1,902,988
SHAVING MACHINE
Filed March 7, 1931  3 Sheets-Sheet 1

INVENTOR.
George R. Bott
BY
his ATTORNEY March 28, 1933.  G. R. BOTT  1,902,988

SHAVING MACHINE

Filed March 7, 1931  3 Sheets-Sheet 3

INVENTOR.
George R. Bott
BY
his ATTORNEY

Patented Mar. 28, 1933

1,902,988

UNITED STATES PATENT OFFICE

GEORGE R. BOTT, OF STAMFORD, CONNECTICUT

SHAVING MACHINE

Application filed March 7, 1931. Serial No. 520,795.

This invention relates to a machine for shaving and cutting hair, the invention being more particularly related to an improved machine of this character which embodies improved power-operated cutting means and to a machine in connection with which, in order to obtain thoroughly satisfactory results, it is unnecessary to apply to the beard or hair a softening agent such as lather, cream or liquid.

One of the objects of the invention is the provision of a machine of the character described, which will embody certain desired features of simplicity and convenience, which will dry shave cleanly and closely without irritating the skin, and one in which the parts are so fashioned and combined that the cost of manufacture will be reduced to a minimum. In the construction of the machine, I have provided several important and advantageous features, especially with regard to simplicity of the parts, facility in their assembly and arrangement, and durability and efficiency in their operation.

Another object of the invention is the provision of a shaving machine embodying, as an important feature thereof, an inner and an outer series of curved coacting shearing members. In carrying this object into effect, I provide separate holding devices or structures for the respective inner and outer series of members. The members of each series may be made in the form of thin rings, or thin ring segments, and these are permanently fixed in spaced relation on their holding devices so as to provide alternating shearing members and slots along a cylindrical course, with the members curving about a common axis and forming in general a cylindrical structure.

The inner holding device is arranged for axial oscillation within the outer holding device and with the shearing members of the former in sliding contact with the shearing members of the latter. The outer faces of the inner members and the inner faces of the outer members, where they meet in sliding contact, are ground to provide coacting shearing edges.

The outer cylindrical structure, longitudinally along one side thereof, has a gap or window, the width of which is equal approximately to about one-fourth of the circumferential dimension of the structure. The inner and outer series of members bridge this gap; and the outer series of members, whose outside faces are fully exposed for the full area of the gap, serve in the capacity of guards and provide a curved rack-like shaving panel or side for resting against the skin. Where they bridge the gap, the outer members are made very thin and preferably they are ground so that their cross sectional dimensions, between their outer and inner faces, gradually decrease from the opposite longitudinal edges of the gap to a wafer-like fineness along a line midway between such longitudinal edges. With this construction, the stubble which remains after the shaving operation can be no longer than the wafer-like fineness of the guards along this mid-line of the shaving panel.

Another object of the invention is to provide a machine having a continuously curved shaving panel or side, the curved guards of which are adapted, when the machine is moved over the skin, to roll up a wave of skin covered flesh in front of the shaving panel or side. As the back surface of the rolled-up wave is more or less concaved against the convexed outside faces of the guards, the hair on such back surface is tilted toward and between the coacting shearing edges. By this arrangement, the hair is sheared off in successive dust-like fragments, beginning at a point at or near its outer end and continuing to a point exceedingly close to the skin. If a hair is quite long, its intermediate portion is tilted into and between the shearing edges so that the shearing commences at a point intermediate the length of the hair and thence continues until shaved off close to the skin, as in the case of short hair.

The interior or bore of the outer shearing device wherein the inner shearing device is positioned for relative oscillation, is formed eccentrically and in such manner that it is in open communication with the slots of the shaving panel or side. This feature of the invention while permitting the parts to be associated and arranged as above pointed out and while providing for a sturdy construction that possesses the advantages of compactness and convenience, enables the parts of the machine to be produced and assembled in various ways and at a low cost of production.

A further object of the invention is the provision of a machine in which the length of the shaving panel, instead of being located transversely to the longitudinal axis of the handle, will be in lengthwise relation therewith.

With the above and other objects in view, the invention consists in the improved shaving and hair-cutting machine and in the form, construction, and relative arrangement of its several parts, as will be hereinafter more fully described and claimed.

Several simple and commercially practical examples of the invention are disclosed in the accompanying drawings in which:—

Referring with more particularity to the accompanying drawings, the first to the embodiment of the invention presented in Figs. 1 to 8, 21 designates a hollow elongated handle to one end of which is attached one end of an outer cylindrical shearing device including a housing 22 and a series of coaxial shearing members 23. The elongated handle and cylindrical housing are connected in lengthwise arrangement, and the handle is shaped exteriorly to fit the interior of the hand and to be grasped by the hand. The shearing members 23 consist, in the present instance, of the coils of a helical spring which is denoted generally by the reference numeral 24. The housing may consist of bakelite, formica, hard rubber or other suitable material capable of being molded. It is molded around approximately three-fourths of the circumference of the helical spring, leaving for the remaining one-fourth of the circumferential distance a gap or window 25 between its opposite longitudinal edges 25'. The helical spring is molded in the housing in such manner that the coils thereof are held in equi-spaced relation and so that at the gap 25, where the coils are exposed between the two opposing longitudinal edges 25', spaces or slots 26 will intervene between the coils for the projection of hair into the interior of the helical spring. The helical spring is preferably molded in the housing in a state of rigidity, with the inner curves of the coils under compression and the outer curves thereof under tension. The gap 25, wherein the alternating coil members 23 and slots 26 are exposed, extends longitudinally of the housing and constitutes the shaving panel or side of the machine; and said members 23 which curve on similar bridge-like arcs between the opposing longitudinal edges 25', constitute a bowed rack-like shaving guard for resting against the skin when the shaving operation is to be performed. The helical spring is made of razor steel material and its coils are fine in cross section. The intervening slots 26 are approximately of a width equal to the dimensions of the coils between the slots.

Within the helical spring, the housing is provided with an eccentric bore or chamber 27, cross-sectionally round and so made that it is in open communication with the slots or spaces 26 of the shaving panel. The inside surfaces of the members 23 are uniformly ground off so as to provide smooth concaved sliding faces 28 and continuously curved shearing edges 29. This operation can be performed accurately and with dispatch by using a bore grinder. The convexed outside faces of the members are rounded and smoothed as at 30 for resting against the skin. To attain the desired exterior roundness and smoothness, the spring before the housing is molded thereon, may be tumbled in a tumbling barrel. The coils of the spring are firmly held in the housing molded thereon, and owing to the provision of the eccentric bore within the helical spring, it will be observed that the molded material gradually increases in thickness from the two longitudinal edges 25' toward the back of the structure where the housing is of the greatest thickness. A sturdy structure is thus produced which possesses the advantage of being relatively light in weight. The housing may be detachably mounted to the handle in any suitable manner; and in the present instance the handle is represented as provided with a reduced portion 31 upon which the end of the housing is secured by screws 32. The parts may be so fashioned and the connection between the handle and housing may be so made that the longitudinal axis of the handle will be coaxial with the longitudinal axis of the eccentric bore 27.

Figure 7:
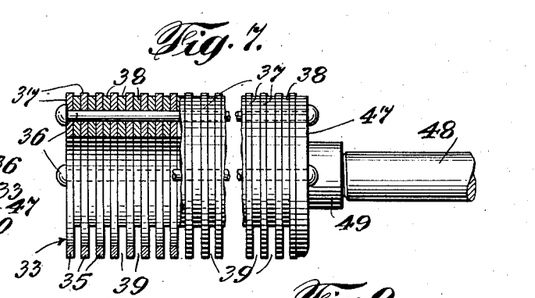
Fig. 7 is a fragmentary detail, in section and side elevation, of the inner shearing device.
Figure 8:
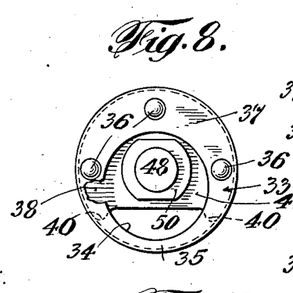
Fig. 8 is a view of the left-hand end thereof.

The inner shearing device comprises a series of wafer-like shearing members in the form of rings 33 whose holes 34 are cut eccentrically so as to provide portions 35 which are relatively thin and from which the material of the rings gradually widens in both directions. These ring shearing members are coaxially and symmetrically mounted in equi-spaced relation on a framework consisting of spaced rods 36, which are positioned in circular order and passed transversely through suitably spaced apertures in the relatively wide portions 37 of the rings, and also through transverse apertures in suitable segmental wafer-like spacer plates 38 that are interposed between the rings so as to provide between the rings at the shaving panel hair receiving slots or spaces 39. The segmental spacer plates are formed and mounted so as to leave approximately quarter sections of the rings exposed in radial harmony with the exposed portions 23 of the outer shearing members; and it is to be observed in this connection that these parts are so arranged and combined that the thinnest portions of the rings come in the arc midway between the two opposite ends 40 of the spacers and radially behind the thinnest portions of the outer shearing members. The outer faces of the members 35 are uniformly ground to provide smooth convexed surfaces 41 and shearing edges 42. In order that the shearing faces of the members 35 will have the desired degree of smoothness and accuracy, it is best to perform the grinding operation after the members have been firmly mounted in place on the framework. According to a characteristic feature of my invention, the convexed outside faces 41 of the inner shearing members 35 slide across and in contact with the concaved inside faces 28 of the outer shearing members 23. With this construction, the coacting shearing edges 29 and 42 at the shaving panel and especially along the mid-line thereof, come exceedingly close to the skin so that the hairs which protrude through the slots 26 and into the slots 39 (see Fig. 6) will be sheared off close to the skin. In this connection it will be appreciated that in the shaving operation, the skin will itself protrude more or less into the slots 26 between the outer members 23 and toward the coacting shearing edges. In the section and perspective view of Fig. 6, I illustrate hairs 43 protruding through the slots 26 and into the slots 39 in position to be sheared off on the movement of the shearing edges 42 across the shearing edges 29. Owing to the continuously curved shearing edges, the hairs are always severed or sliced off on a curve, and the severed fragments as well as the remaining stubble are cross-sectionally curved.

Figure 19:
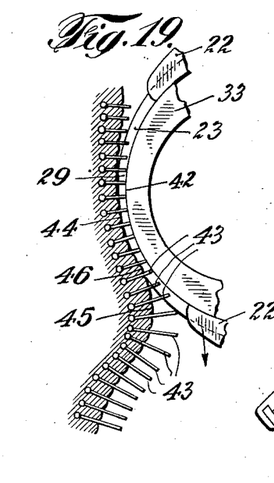
Fig. 19 is a diagram showing a wave of skin covered flesh pushed up in front of the shaving panel so as to tilt the hair into and between the coacting shearing edges.

In Fig. 19, I illustrate diagrammatically on an enlarged scale the relation between the skin 44, when it is pressed by the shaving panel, and the continuously curved coacting shearing edges 29 and 42. As the machine is moved over the skin, a wave 45 is raised in the skin in the front of the convexed outside surfaces of the guards. The back 46 of the wave is naturally given a more or less concaved form against the guards. The hairs 43, when free and under the concaved undulations of the back of the wave, are tilted toward and between the coacting shearing edges 29 and 42. Under this arrangement, with the inner cutter oscillating rapidly, the hairs are clipped into very fine particles, beginning at or near the outer ends thereof and continuing inwardly toward the skin until at the mid-line of the shaving panel they are clipped off exceedingly close to the skin. If a hair is relatively long, its intermediate portion is tilted into a position between the coacting shearing edges so that the hair is first clipped at its intermediate portion and thence the clipping continues until the hair is severed close to the skin.

Figure 1:
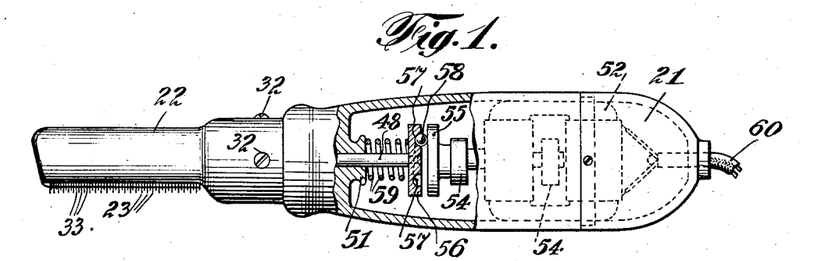
Figure 1 represents a side view and section of a shaving machine constructed in accordance with the present invention, the power means for operating the inner shearing device being illustrated in broken lines.
Figure 2:
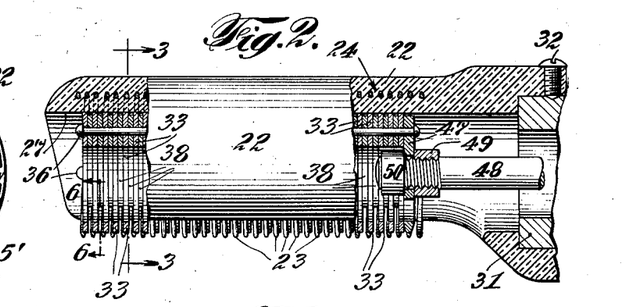
Fig. 2 is an elevation and section on a larger scale, showing the inner and outer shearing devices.
Figure 3:
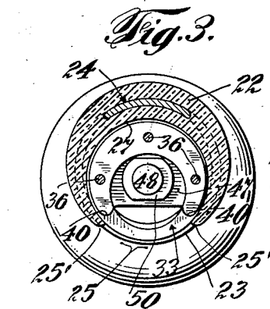
Fig. 3 represents a cross section on the line 3—3 of Fig. 2.
Figures 4, 5, 6:
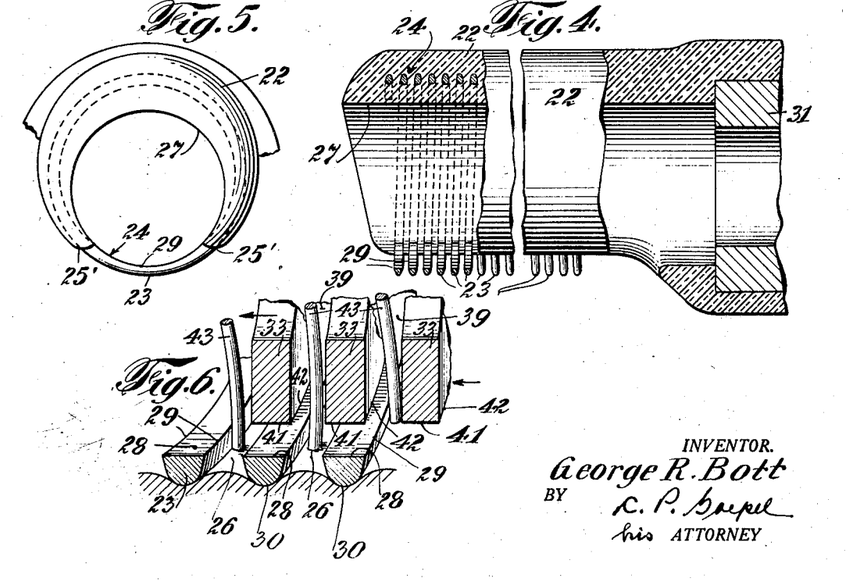
Fig. 4 is an enlarged fragmentary view, in side elevation and section, of the outer shearing device.
Fig. 5 is a view of the left-hand end of the outer shearing device shown in Fig. 4, with parts broken away.
Fig. 6 is a detail section and perspective, on an enlarged scale, with the section taken on the line 6—6 of Fig. 2 and looking from the right of said line, this view showing the relation between the curved shearing edges of the inner and outer shearing devices.

The rods 36, whereon the inner shearing members 35 and spacers 37 are firmly mounted and bound together, may be supported in any suitable manner. In the present instance, they are united at one end to an end plate 47 which is centrally screw-threaded upon a shaft 48. Suitable nuts as 49 and 50, screw-threaded upon the shaft 48, may be applied against the opposite sides of the end plate for securing it firmly in position. The shaft 48 with which the end plate is thus united is coincident with the common axis of the shearing rings 33. Said shaft 48 may be mounted for lengthwise oscillation in a bearing guide 51 provided for the purpose in the handle. For oscillating the shaft 48, any suitable motor driven mechanism may be provided within the hollow handle 21. In the present instance, I show as one illustrative means by which oscillating movement may be imparted to the shaft 48, an electric motor 52 having a driving shaft 53 mounted in bearings 54 fixed to the handle. The electric motor is mounted in such manner that the driving shaft 53 will be in adjoining coaxial relation with the shaft 48. Said driving shaft 53 carries a disk 55 and the adjacent end of the shaft 48 carries a similar member 56 in which is provided a relatively deep annular cam groove 57. Disposed in the groove is a ball 58 for engagement with the face of the disk 55. A spring 59 is coiled around the shaft 48 and imprisoned between the bearing 51 and disk member 55. As the shaft 53 rotates the ball cam 58 forces the shaft 48 longitudinally against the tension of the spring 59. The spring returns the shaft 48 to its original position after each outward thrust. With this construction, during the operation of the electric motor, the shaft 48 is caused to oscillate axially; and the cam groove 57 is cut so that the rapidly rotating motor shaft will make approximately three revolutions to each oscillation of the shaft 48. The electric motor 52 may be connected with any suitable source of current by means of a flexible cable 60. As previously intimated, the means herein illustrated for oscillating the shaft 48 is illustrative only, and in practice any suitable power means adapted to be contained within the hollow handle 21 may be substituted for the particular means herein disclosed.

Figure 9:
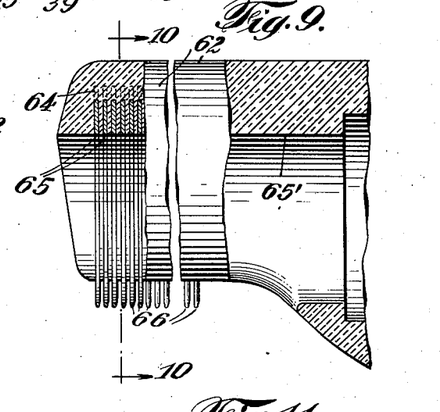
Fig. 9 is a fragmentary side elevation and section showing an alternate form of the outer shearing device.
Figure 10:
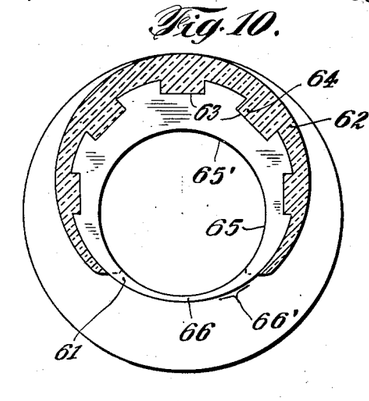
Fig. 10 represents a cross section on the line 10—10 of Fig. 9.

In Figs. 9 and 10, I show a modified form of the outer shearing device. In lieu of the helical spring, I provide wafer-like rings 61 which are molded in equi-spaced positions in a housing 62 consisting of bakelite, formica, hard rubber, or similar material adapted to be molded. The rings may have spaced notches 63 adapted to receive portions 64 of the molded material, whereby to hold the rings firmly in position against any circular displacement. These rings are provided with eccentric holes 65 which are cross-sectionally round and of a diameter corresponding with the diameter of the eccentric bore 65′ of the housing, and they are molded symmetrically in place with their thinnest portions 66 in position to oscillate across the thinnest portions of the outer shearing members. The housing is molded around approximately three-fourths of the circumferences of the rings so as to leave, as in the first described example, a gap 66′ through which the rings curve to furnish the rack-like panel for resting against the skin.

Figures 11, 12:
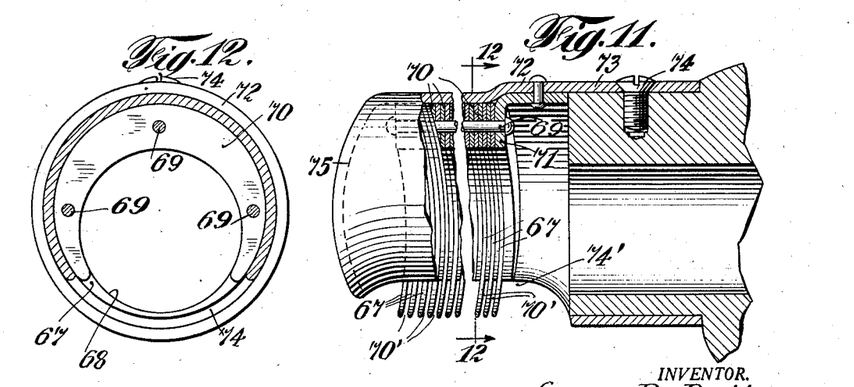
Fig. 11 represents a fragmentary elevation and section of another form of the outer shearing device.
Fig. 12 represents a cross section on the line 12—12 of Fig. 11.

In the form of the outer shearing device shown in Figs. 11 and 12, the shearing members consist of wafer-like rings 67, eccentrically holed as at 68 and mounted on rods 69. Suitable segmental wafer-like spacers 70 are also mounted on the rods between the rings in order to provide between the rings the necessary slots 70′ at the shaving panel. The rods 69 are riveted at their inner ends to an inwardly curved flange 71 which is secured to and inside of a casing or housing 72 produced from sheet metal. This housing has a suitable neck or ferrule portion 73 whereby to be secured to the handle by screws 74 or other suitable means. Along one side the housing is cut away for approximately one-fourth of its circumference in order to provide the necessary space or gap for the shaving panel. At its front end, the housing may be provided with a hood 75 which is spaced a distance from the outermost ring in order to provide an end channel through which to blow out or otherwise effect a discharge of the hair fragments. In this skeleton form of construction, the rings 67 may be warped or bent out of a flat plane and be thereby materially stiffened to prevent undesirable flexing between the slots 70′. The spacers 70 are, of course, warped or bent in agreement with the warping of the rings between which they are placed.

It is in place to mention here that the ring members of the inner cutter disclosed in Figs. 7 and 8 and the spacers for retaining the same in place, may be warped or turned aside in a manner resembling the warped rings and spacers disclosed in Figs. 11 and 12. Mention at this point may also be made of the fact that, instead of using rods and spacers as shown in Figs. 7 and 8, the rings of the inner device may be embedded in a housing composed of bakelite or similar molded material.

Figures 13, 14, 15, 16, 17:
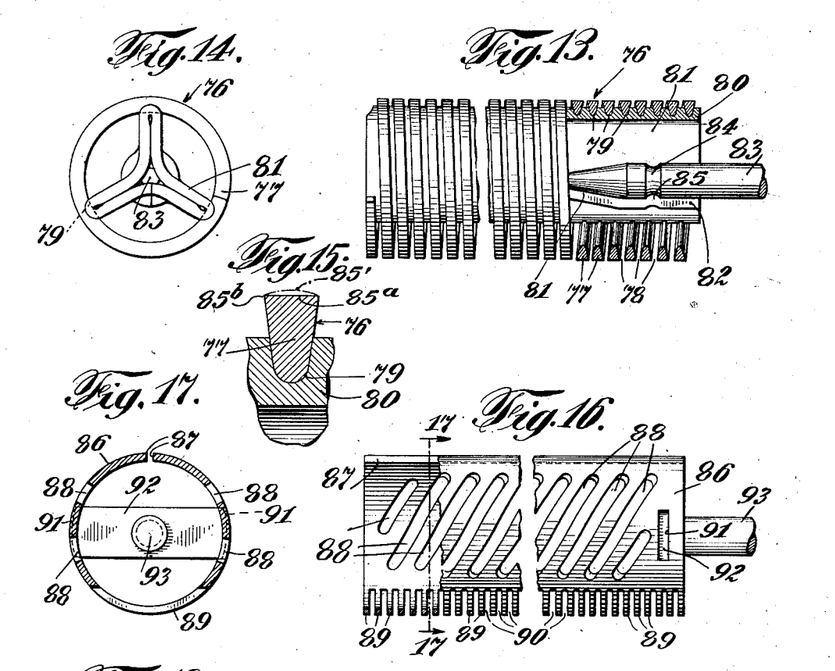
Fig. 13 is a fragmentary elevation and section of an alternate form of the inner shearing device.
Fig. 14 is a view of the left-hand end thereof.
Fig. 15 is an enlarged sectional detail illustrating the manner in which a coil of the shearing wire is mounted in a recess in the spider frame, and illustrating also by a dash-dot line how the outer face of the coil is ground away to produce the shearing edges.
Fig. 16 is a fragmentary elevation and section of another form of the inner shearing device.
Fig. 17 represents a section on the line 17—17 of Fig. 16.

In Figs. 13, 14 and 15, I disclose another form in which the inner shearing device may be produced. In this instance I provide a helical wire 76 of oblong cross-sectional form, and the convolutions of this wire in order to provide the necessary shearing members 77 alternating with slots 78, are wound or disposed in notches 79 provided in proper spaced positions in the horizontal members 80 of a three-arm spider frame 81. The tubular axis 82 of the spider frame receives therein the outer end of the oscillating shaft 83. The spider frame with the wire cutters thereon may be allowed to have relative circular movement with respect to the oscillating shaft 83. In the present instance, for permitting such relative circular movement, the shaft 83 is represented as provided with an annular recess 84, while the tubular axis 82 is made with an annular protuberance 85 shaped to have turning fit in said recess. The cross-sectionally oblong convolutions of the wire are set in the recesses 79 so that the outer faces as 85' (Fig. 15) of the convolutions will project well beyond the outer faces of the horizontal members 80. After the convolutions of the wire have been properly mounted in the retaining recesses, the outer faces 85' are uniformly ground off to produce the cross-sectionally flat shearing faces 85a and shearing edges 85b. Since the wire cutter is mounted for relative circular movement, fresh portions of the shearing faces may be continually brought into coaction with the shearing members of the outer device. The shearing faces 85a on the convolutions may be readily and accurately produced by using a centerless grinder.

Figure 18:
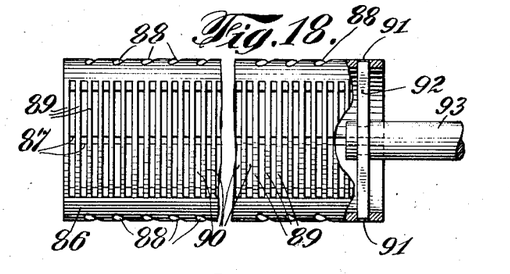
Fig. 18 is a fragmentary view of the device shown in Fig. 16, with the back portion of the device partly broken away and looking toward the inner faces of the shearing members.

In Figs. 16, 17 and 18, I disclose a further form of the inner shearing device. In this instance, I provide a thin plate of razor steel, and this plate is bent into the form of a cylinder 86, the longitudinal edges 87 of which are spaced apart for a distance sufficient to enable the cylinder to be circumferentially contracted and expanded. To contribute further to the resilient character of the cylinder, the plate is made along opposite zones with series of spaced elongated slots 88. Opposite the spaced confronting longitudinal edges 87, the cylinder is slit transversely so as to provide a panel of alternating shearing teeth 89 and slots 90. The cylinder, adjacent one end thereof, is provided with aligned slots 91 in which are inserted the opposite ends of an end piece 92, and an oscillating shaft 93 is attached to the center of said end piece. The manner of associating the cylinder with the end piece permits relative circumferential expansion and contraction of the cylinder. This type of inner shearing device may be made in such cross-dimensional size that it will normally be somewhat larger than the inside diameter of the bore into which it is to be fitted, so that when it is once contracted sufficiently to be placed in the bore, it will automatically expand and thereby provide a very intimate resilient contact between the convexed shearing faces of the teeth 89 and the concaved inside shearing faces of the shearing members of the outer cylinder.

The different types of inner shearing devices herein disclosed may be used interchangeably with the different types of outer shearing devices herein disclosed. All of the types have been devised to permit fabrication at a very low cost. With respect to each type, the various elements forming part thereof have been designed so as to be easily assembled, ground, lapped and put into the desired relation and shearing condition at a very economical cost.

Figure 20:
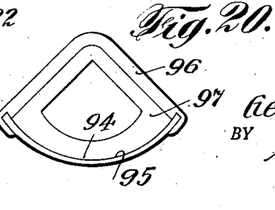
Fig. 20 is a diagram of the inner and outer shearing members, showing each in the form of a segment of a circle.

It is to be remarked here that my invention in its simplest form consists in the provision of inner and outer shaving panels composed of coacting continuously curved shearing members alternating with slots. The holding devices for the inner and outer panels need not necessarily be in the form of complete cylinders with circumferences of 360°. These holding devices may, in practice, consist of cylindrical segments of a size and extent merely sufficient to carry the panels of the curved coacting shearing members which are of sufficient extent if they curve through arcs of approximately 90°. In the diagram of Fig. 20, I illustrate by way of example the curved coacting inner and outer shearing members 94 and 95 in conjunction with holding devices 96 and 97 in the form of cylindrical segments.

The machine may be moved in all directions over the skin and the curved guards will protect the skin against the shearing edges. In all of the forms of construction herein exemplified, the guards of the shaving panel are continuously curved and attain their maximum thinness at the mid-line of the shaving panel. Hair may enter the slots between the guards from either direction toward the mid-line of the shaving panel and hence the machine will perform the shaving operation when moved in either direction. Since the shaving panel extends along one side of the housing with the handle in longitudinal alignment therewith, the movements of the handle in making the shaving strokes may be in general a copy of the movements that are usually made in shaving with the old type of straight edge razor.

The guards, being of continuous circumferential form, rest or contact tangentially against the skin along a line parallel with the axial oscillation of the inner device, with the circumferential shearing members and slots of both the inner and outer shaving panels extending in either direction from such contact line outwardly and away from the skin so that from either direction hair may enter through the circumferential slots of both the outer and inner panels to the coacting shearing edges. During the shaving operation and especially when following the specific contours of the face, whether rounded, hollow or angular, the machine is naturally not held entirely steady, but due to the nervous flexing of the arm muscles, is rocked more or less. In my machine, owing to the fact that the inner and outer circumferential shaving panels follow true circles, the rocking of the handle in nowise decreases or limits the effectiveness of the machine, since irrespective of the rocking action or its direction, whether forward or backward, the line of tangential contact with the skin is always parallel with the long axis of the handle and with the axial oscillation of the inner shaving panel. The coacting shearing edges are automatically sharpened due to the crosswise oscillation of continuous curves in sliding contact with continuous curves.

While I have illustrated and described my invention as taking certain selected forms, it will be understood that changes and alterations may be made in the particular details set forth and in the particular forms of construction without departing from the spirit of the invention, and hence I do not limit myself to the particular details set forth or to the particular forms of construction, but consider myself at liberty to make such changes and alterations as may fairly come within the scope of the appended claims.

I claim :—

1. In a shaving machine, a spiral coil composed of razor steel, a holder for the coil having an open side, the holder retaining the convolutions of the coil in fixed relation and so as to provide a shaving panel of curved alternating guards and slots across the open side, the convexed outside faces of the guards being adapted to rest against the skin and the concaved inner faces thereof being ground to provide shearing edges, and a shearing device movably positioned within the coil and having a shearing coaction with the shearing edges of the guards.

2. Shearing means comprising a molded body having an open gap along one side thereof, together with a series of members molded in said body in fixed spaced-apart relation and curving across said open gap, and the inside faces of said members being ground to provide shearing edges.

3. Shearing means comprising a molded body having an open gap along one side thereof and a spiral coil of razor steel molded in said body with the convolutions thereof held in spaced relation and curved across said open gap, providing thereby an exposed shearing panel, in combination with an operative shearing device positioned to operate in shearing coaction with the exposed shearing panel.

4. Shearing means comprising a molded body having an open gap along one side thereof and an eccentrical bore cross-sectionally round in open communication with said gap, wafer-like members of razor steel molded in said body and eccentrically holed in correspondence with said bore to provide across the gap a panel of thin guards adapted to rest against the skin, shearing edges provided on the inner faces of the thin guards, and an operative shearing device positioned in the bore and eccentrical holes to operate in shearing coaction with the shearing edges of the thin guards.

5. Shearing means comprising a central frame together with a spiral coil produced from razor steel, the frame having spaced seats therein for receiving and retaining the convolutions of the coil in spaced relation to provide slots between the convolutions of the coil, with the convolutions of the coil protruding from the seats beyond the surface of the frame, and shearing edges provided on the protruding faces of the convolutions.

6. Shearing means comprising a frame including spaced parallel rods arranged in circular order, wafer-like members of razor steel mounted on the rods and eccentrically holed to provide a panel of thin segments, spacing means on the rods between the members to maintain the latter in fixed spaced relation and thus provide slots between the thin segments, said washers having corresponding gaps therein at the panel of thin segments to provide open communication between the slots and the eccentrical holes of the members, shearing edges provided on the inner faces of the segments, and an operative shearing device positioned in the eccentric holes to operate in shearing coaction with the shearing edges of the segments.

7. In a shaving machine, two holders which are transversely round, curving about an axis, one being movably nested within the hollow of the other, each holder including a panel of continuously curved shearing members and slots in alternating relation, the shearing members of the two panels having shearing edges continuously curved therewith and contacting in hair-clipping coaction, means for axially reciprocating one of the holders relatively to the other to cause the shearing edges of the two panels to clip hair received in the slots of the two panels, and the shearing members of the outer panel including as segments thereof continuously curved correspondingly-positioned guard portions adapted to rest and rock on the skin along a tangential line substantially parallel with the line of axial reciprocation, with the circumferential slots on either side of said tangential contact line curving outwardly and away from the skin for the entrance of hair to the coacting shearing edges, and means for reinforcing the individual shearing members of the outer panel at opposite ends of the guard portions to prevent distortional bending of such members and hence distortional bending of the guard portions.

8. In a shaving machine, inner and outer holders, transversely round in form, and curving about an axis, the inner holder being nested within the hollow of the outer one, each holder including a panel of continuously curved shearing members and slots in alternating relation, the shearing members of the two panels having continuously curved cooperative shearing edges, a handle at one end of the outer holder, and means supporting the inner holder for axial reciprocation relatively with respect to the outer holder and handle and in a position in which the shearing edges of the panel on the inner holder will shear across the shearing edges of the panel on the outer holder to clip hair received in the slots of the two panels, the shearing members of the outer panel including as segments thereof continuously curved correspondingly-positioned guard portions adapted to contact with the skin along a line parallel with the axial reciprocation of the inner holder and to be rocked on the skin in response to any rocking of the handle, with the circumferential slots on either side of the line of skin contact curving outwardly and away from the skin for the entrance of hair to the cooperative shearing edges, and separate means embracing the individual shearing members of the outer panel at opposite ends of the guard portions to prevent distortional bending of such members and hence distortional bending of the guard portions.

9. A shaving machine having inner and outer panels, each having the form of a side of a cylinder curving about an axis, the inner panel being positioned in the hollow of the outer panel and adapted to be reciprocated axially with respect to the outer panel, said panels each consisting of continuously curved shearing members and hair-receiving slots in alternating relation, the shearing members of the two panels having shearing contact and adapted, on the axial movement of the inner panel, to shear off hair entering through the slots of the two panels, the outer faces of the shearing members of the outer panel being adapted tangentially to contact the skin along a line parallel with the axial reciprocation of the inner panel and leaving on either side of the tangential contact line, open bights for the hair to enter directly into the circumferential slots of the two panels, and separate means engaging the members of the outer panel to prevent distortional bending thereof.

10. A shaving machine having a handle rockable with the hand by which it is grasped, two shearing panels carried by the handle, each having the form of the side of a cylinder curving about an axis extending in the direction of the length of the handle and the panels being positioned one exteriorly of the other and one adapted for reciprocation axially with respect to the other, each panel including continuously curved shearing members and hair-receiving slots in alternating relation, the shearing members of the two panels being in shearing contact and adapted, on the axial movement of the reciprocating panel, to shear off hair entering through the slots of the two panels, the outer faces of the shearing members of the exterior panel being adapted tangentially to contact the skin along a line parallel with the axial reciprocation of the reciprocating panel and hence in line with the length of the handle and to have tangential rocking contact with the skin from and to said parallel line in accompaniment with the rocking of the handle, and separate means engaging the individual members of the exterior panel to prevent distortional bending thereof.

11. In a shaving machine, an element adapted to be rocked on its longitudinal axis, carrying a panel of continuously curved guards and hair-receiving slots in alternating relation, and forming a concaved hollow, the inner faces of said guards being provided with shearing edges, a second element carrying a panel of continuously curved shearing members and hair-receiving slots in alternating relation, the panel of the second element being disposed in the hollow of the first panel and the members thereof having shearing edges contacting the shearing edges of said guards, means for axially reciprocating the second element to shear by direct cross strokes the hair entering the slots of the two panels, the convexed faces of the guards being adapted to rock on the skin tangentially on a contact line parallel with the axial reciprocation of the second element, with the hair-receiving slots of both panels curving outwardly from the skin in both directions from the contact line, and separate means reinforcing the first-named panel adjacent the guards whereby to maintain this panel and hence the guards against distortional bending.

12. In a shaving machine, the combination of transversely curved outer and inner shearing panels, one adapted to be reciprocated axially in relation to the other, the outer device having curved inside shearing edges and the inner device having curved outside shearing edges in contact with the shearing edges of the outer device, each of the panel devices with its shearing edges curving on a true circle and each having circumferential slots for the entrance of hair to the shearing edges, the outer panel device being adapted to rest and rock on the skin on a tangential contact line with the hair-receiving slots of both panels curving outwardly from the skin in both directions from such contact line, and separate rigid means borne by the outer panel at the opposite sides of its tangential contact line for keeping the outer panel in a condition of rigidity.

13. In a shaving machine, the combination of transversely curved outer and inner shearing panel devices, the outer device having curved inside shearing edges, the inner device having curved outside shearing edges contacting with the shearing edges of the outer device, a handle connected at one end with one end of the outer device, means on the handle supporting the inner device for axial reciprocation with respect to the outer device, each of the panel devices with its shearing edges curving on a true circle about an axis in line with the length of the handle and each having circumferential slots for the entrance of hair to the shearing edges, the outer panel device being adapted to rest on the skin and rock thereon in accompaniment with the rocking of the handle on its longitudinal axis, and upon a tangential line with the hair-receiving slots of both panels curving outwardly from the skin in both directions from the contact line, and separate rigid means borne by the outer panel to prevent distortional bending thereof.

14. In a shaving machine, outer and inner holding devices, one adapted to be axially reciprocated in relation to the other, the outer device including a shaving panel curving on a substantially true circle for resting tangentially along its length against the skin and consisting of circumferential alternating guards and slots, circumferential edges provided on the inside of the guards, circumferential shearing edges and slots on the inner device coacting with the shearing edges and slots of the guards, said shaving panel being adapted, when the machine is moved over the skin, to roll up a wave of skin in front of the guards for tilting the hair into the circumferential slots of both devices and between the coacting circumferentially extending shearing edges thereof, and separate rigid means borne by the outer panel to prevent distortional bending thereof and hence distortional bending of its shearing edges.

15. In a shaving machine, outer and inner holding devices, one adapted to be axially reciprocated in relation to the other, the outer device including a shaving panel curving on a substantially true circle for tangentially resting along its length on the skin and consisting of circumferential alternating guards and slots, circumferential shearing edges provided on the inside of the guards, circumferential shearing edges and slots on the inner device coacting with the shearing edges and slots of the guards for shearing hair entering into the circumferential slots of the two devices, said circumferential guards cross sectionally narrowing to a contact line of minimum thinness whereby along the length of the outer device to provide a tangential shaving line of maximum thinness between the skin and said coacting shearing edges, and rigid means borne by the outer panel to prevent distortional bending thereof and thus to provide for the rigid support of said narrowing guards by the reinforced panel.

16. In a shaving machine in combination, a cylindrical support, a shaving panel incorporated in one side thereof, consisting of spaced circumferential guards the outer faces of which are adapted along the length of the panel to rest tangentially on the skin, shearing edges provided on the inner faces of the guards, a hollow handle at one end of the support and a shaft, circumferential shearing means carried by the shaft and freely rotatable with respect thereto, and positioned within the support to have shearing coaction with the shearing edges of the guards, said shaft being mounted for axial reciprocation to reciprocate axially the circumferential shearing means carried thereby while at the same time permitting free rotation of such shearing means.

17. In a shaving machine, the combination of a cylindrical housing having a bore and a gap at one side in communication with the bore, separate guard members carried by the housing and spanning the gap, said members being continuously curved and having within the bore inner shearing edges concavely curving in the direction of the curvature of the members, and a shearing device mounted within the bore for axial reciprocation and consisting of spaced continuously curved shearing parts having outer shearing edges convexly curving in the direction of the curvature of the parts for crosswise shearing coaction with the concavely curved shearing edges of the guard members.

18. Shearing means comprising an elongated holder, shearing members carried by the holder, their bodies being continuously curved about a common axis and progressively thinning to central segments, means rigid with the holder, engaging the thinning bodies individually and terminating at points at opposite ends of the central segments, which are left free and exposed for shearing action, said means retaining the bodies individually against distortional bending to provide for the support of the exposed central segments by the reinforced portions of the bodies.

19. Shearing means comprising a holder, ring-shaped shearing members carried thereby and positioned with their axes in aligned relation, means rigid with the holder bracing and reinforcing the members individually for more than one-half of their circumferential extent to hold the members against distortional bending, said means terminating at spaced points to leave curved correspondingly-positioned segments of the members free and exposed, and shearing edges provided on said segments.

20. Shearing means comprising a holder, thin shearing members carried by the holder and continuously curved about a long axis substantially parallel with the holder, means on the holder rigidly bracing and reinforcing the members individually and to an extent sufficient to hold them in a condition of rigidity, with the inner curves of the members under compression and the outer curves thereof under tension, whereby to prevent distortional bending of the members, said means terminating at spaced points to leave curved correspondingly-positioned segments of the members free and exposed for contacting with the skin as a shaving panel.

21. In a shaving machine, continuously curved shearing members, an elongated holder to which the members are secured with their axes in aligned relation, means on the holder bracing the members individually in the direction of the curvature thereof and terminating at spaced points to leave between the spaced points corresponding segments of the members entirely free and exposed to serve as a skin contacting shaving panel along one side of the holder, said bracing means being constructed and positioned to rigidly reinforce the members and prevent distortional bending thereof, and thus to provide for the rigid support of the segments by the reinforced portions.

22. Shearing means comprising a body having straight parallel edges forming an open gap between them, a series of circular shearing members secured to the body and having portions curving across said gap between said parallel edges, and means on the body rigidly embracing said shearing members individually to hold them individually against circumferential distortion whereby to prevent distortion in a circumferential direction of the portions crossing said gap between the parallel edges.

23. In a shaving machine, the combination of an axis, an inner panel of transversely positioned shearing members carried thereby and having outer ground continuously curved shearing edges, an elongated holder shaped to contain the inner panel, its construction including lengthwise extending parallel edges spaced apart to form a gap for accommodating the shearing edges of the inner panel, a panel of outer shearing members having inner ground continuously curved shearing edges curving about the inner panel from one of said parallel edges to the other, and having panel portions lapping the holder at and beyond each of said parallel edges, means on the holder firmly binding said lapping panel portions thereto, and means for mounting said axis in the holder for oscillatory movement with the shearing edges of the inner panel in shearing contact with the shearing edges of the outer panel.

24. In a shaving machine, an outer elongated shearing device adapted to contain a cooperating inner elongated shearing device and having for such purpose lengthwise extending parallel edges spaced apart to provide an accommodating gap, a panel of shearing members having inner ground continuously curved shearing edges curving outwardly from one of said parallel edges to the other, said members alternating with spaces and having portions lapping the holder at and beyond each of said parallel edges, means projecting from the holder filling the spaces between the lapping portions and transversely engaging said portions to prevent both lateral and circumferential displacement of such portions and hence of the members.

In testimony that I claim the foregoing as my invention, I have signed my name hereto.
GEORGE R. BOTT.